Oct. 9, 1928.  1,687,300
J. J. B. LOIZILLON
APPLICATION OF COLD TO THE MANUFACTURE OF FLOUR
Filed Feb. 4, 1927   3 Sheets-Sheet 3

Patented Oct. 9, 1928.

1,687,300

UNITED STATES PATENT OFFICE.

JEAN JOSEPH BERNARD LOIZILLON, OF LA CAUBIE, FRANCE.

APPLICATION OF COLD TO THE MANUFACTURE OF FLOUR.

Application filed February 4, 1927, Serial No. 165,988, and in France February 25, 1926.

It is known that the extraction of flours is effected by grinding the product to be treated between two cylinders or grinding wheels and in passing it through a sieve in order to collect the flour; the grinding being repeated a sufficient number of times for the whole of the kernel to be reduced to flour.

Now, all cereals contain in the state of composition a certain percentage of moisture, variable according to its nature, the climatic conditions in which it has been harvested and the hygrometric state of the bins in which it is stored. If this moisture exceeds a certain rate of saturation, the excess is found to be in the state of mixture and not of combination, and the extraction of the flour in such conditions becomes very difficult, owing to the difficulty of passing damp materials through a sieve. Experience shows that the higher the temperature the lower the saturation point; as soon as the critical temperature is passed, either by the machinery becoming warm or by the elevation of temperature of the atmosphere, the moisture in excess in the corn is expelled, causes it to be damp and interferes with the bolting, the grinding of the improperly bolted material is unsatisfactory and causes a further heating of the grinding machinery, the consequent heating affects adversely the quality of the flours and diminishes their bread-producing properties. It results that the grinding of a cereal harvested under bad conditions and a little too damp is very difficult and sometimes impossible.

With the processes actually in use, the flour mill is therefore compelled to dry these corns, either by a strong aspiration, sometimes insufficient, or by apparatus called conditioners, in which hot air is caused to circulate, the objectional action of the heat in this second case being compensated by a greater ease in milling which reduces the heating of the machinery.

This invention concerns a milling apparatus having for its purpose to obviate these drawbacks, and offering the advantage of operating a regular milling and without waste, whatever may be the moisture in the products used. This apparatus is constructed essentially in such a manner as to permit the milling of cereals and produce of all kind of vegetal origin, by maintaining them at a low temperature by means of a stream of cooled air, so that, at any point of the plant the products of the milling remain always at a temperature lower than the critical temperature of the produce dealt with, the temperature during the milling being lowered proportionally to the degree of moisture of said produce.

The apparatus comprises elevators especially devised to expose the largest possible surface to the cooling action. To this end they are provided with buckets provided with a ribbed or corrugated carrying surface in order to assist the uniform spreading of the products by causing them to form layers and to separate and preventing their settling at the bottom of the buckets. The latter are disposed at a very short distance from each other leaving between them sufficient room to allow the proper emptying of the products and also to allow that the current of air interrupted by a bucket may form itself anew before it reaches the next bucket in order to ensure the continuous action of the cooling current.

The plant is advantageously completed by the use of pyrometers placed, some at the exit of all the grinding and converting apparatus, for allowing adjustment so as not to go beyond the critical temperature, the others at the exit of the refrigerating apparatus, to adjust the cooling.

Besides, in order to avoid the loss of frigories or the formation of moisture by condensation of atmospheric water vapour the building itself is preferably cooled and its air dried by any usual process of drying by cold.

It will follow from these arrangements that the grinding will take place at a uniform temperature and in a regular manner, which will do away with the need of changing the sieve for the passage from summer to winter and reciprocally.

The bread-making quality of the flours produced by the present plant will be much superior, for the rise in temperature is very harmful to the bread output and to its quality. Particularly, the flours obtained at the end of the grinding, the gluten of which was hitherto affected by successive heatings suffered in the various mixing operations, will be of a quality corresponding to the flours obtained at a first grinding from cells situated in the same region of the grain.

Finally the plant which is the object of the invention has equally the advantage of bringing the destruction of parasites, moths and other insects or worms, which usually infest mills.

The appended drawing shows as an example a manner of carrying out the present plant for a mill's installation.

Figure 1:
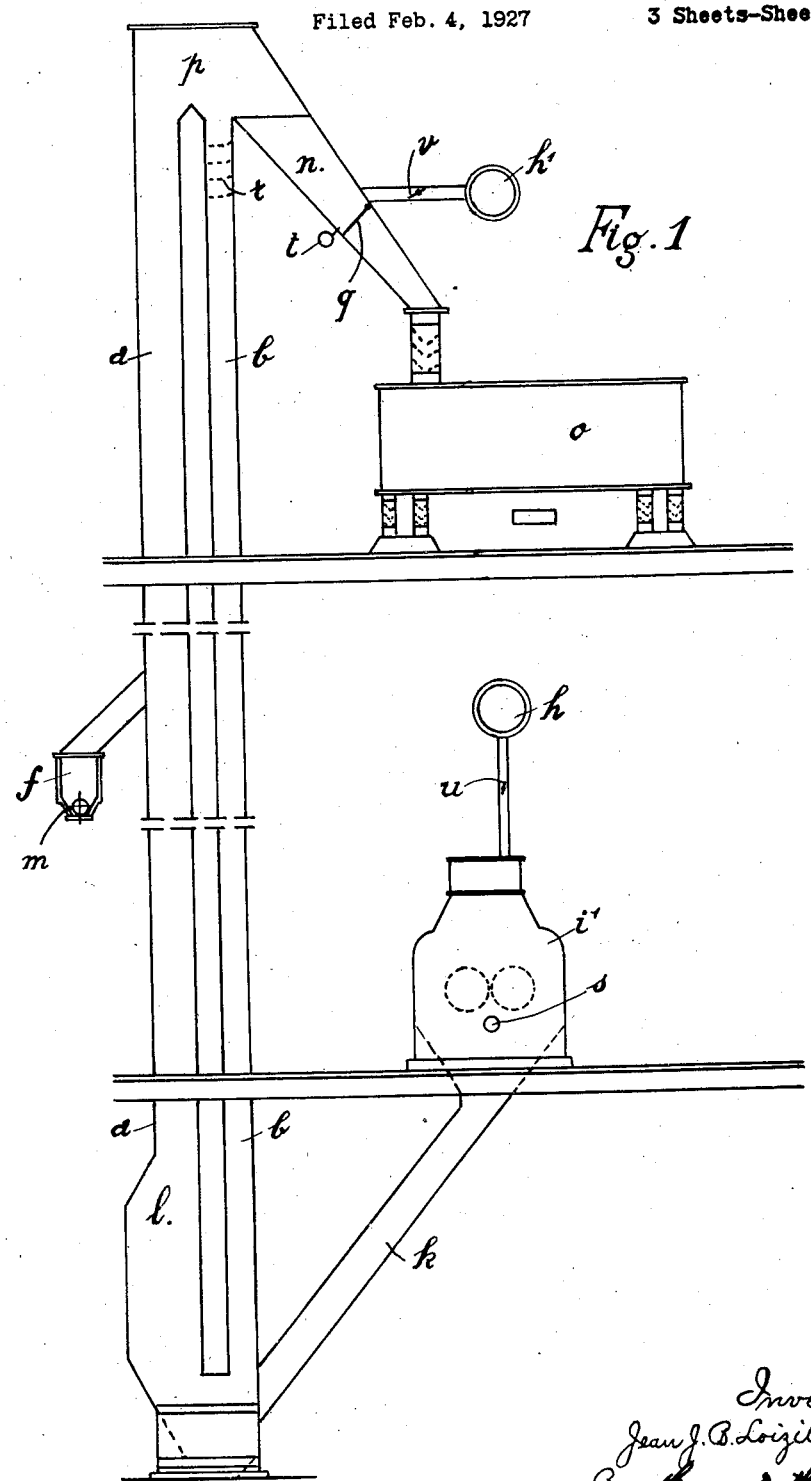
Fig. 1 is an elevation view.
Figure 3:
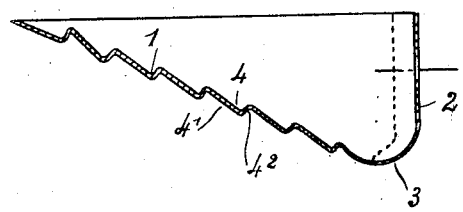
Fig. 3 is a transverse section of an elevator bucket.
Figure 4:
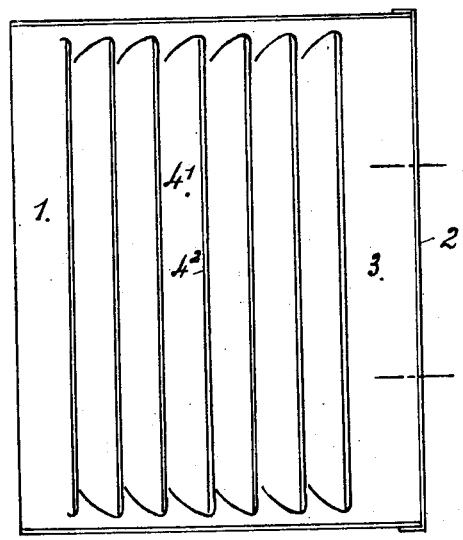
Fig. 4 is a top plan view of same.

The apparatus comprises a system of bucket elevators $a$—$b$ Fig. 1, having an inclined carrying surface 1, Fig. 3, connected with the vertical back 2 by a rounded part 3 and provided with grooves 4 in parallel with each other and with the admission edge. The grooves or corrugations are obtained preferably by stamping and are of the same cross section as the bucket, that is to say they are provided with an inclined bottom $4^1$ contiguous to an approximately vertical back edge $4^2$. Owing to this shape the products are distributed evenly upon the whole carrying surface of the bucket, there is no piling up of the product upon the bottom 3 and the action of the refrigerating current is consequently increased. The ascending branches $a$ of the elevators having a larger cross section than that of the descending branches $b$ are connected to an aspirator or ventilator $c$, by passages $d$ and $f$, through a filter $e$. The abstracted air is sent through a refrigerator $g$ in a passage $c$ conducting to grinding apparatus $i^1$, $i^2$, etc. The latter, in their turn, are connected by passages $k$ to the bottom of the elevating apparatus, which is suitably widened at that point, and having an enlargement $l$ along a certain height.

It will be seen that, first, in descending the passages $k$, the products will be emulsified by a current of cold air, then licked by this same current as they rise in the buckets of the elevator $a$ up to $f$.

As an indication, the speed of the air current in the passages $k$ may be of the order of 12 metres per second, this speed falling to two metres per second in the enlarged portion $l$, where the emulsifying ceases.

A conveying arrangement $m$ of the kind of an endless screw may be disposed in the passage $f$ for the recovery of the products which may be deposited there.

The second portion of the refrigeration takes place between the passage $f$ and a portion $h^1$ which is, as the passage $h$, connected to the refrigerator. The cold air coming from $h^1$ passes by the passages $n$, coming from the bolting apparatus $o$ and ending in an expansion chamber at the top of the elevators. The cross sections are calculated in order to obtain a diminution in the speed in order to avoid the air carrying away the goods with it. As an indication, the speed may pass from 6 metres per second at $h^1$ to 2 metres per second at $p$. A valve $q$ prevents the air from the atmosphere to enter the circuit.

The air will then continue its descending path from $p$ to $f$, so cooling the buckets containing the goods on their way up.

The descending branch $b$ of the elevator is provided with an arrangement of flexible baffles $r$, surrounding the buckets. It functions in a similar manner to a water elevator of the bucket chain type transporting a column of air downwardly, while cooling the said empty buckets, which prepare them to absorb the heat of the products which they will lift in their subsequent ascent.

The electrical pryometers $s$ and $t$ are placed, one $s$, at the point where the goods are hottest, the other $t$ immediately above the valve $q$. Their reading will permit to watch the cooling and to operate the regulation by means of the dampers $u$ and $v$.

It will be conceived that the apparatus so described may be applied to mills which are not provided with an artificial refrigerator and will be satisfied with aspirating atmospheric air.

Figure 2:
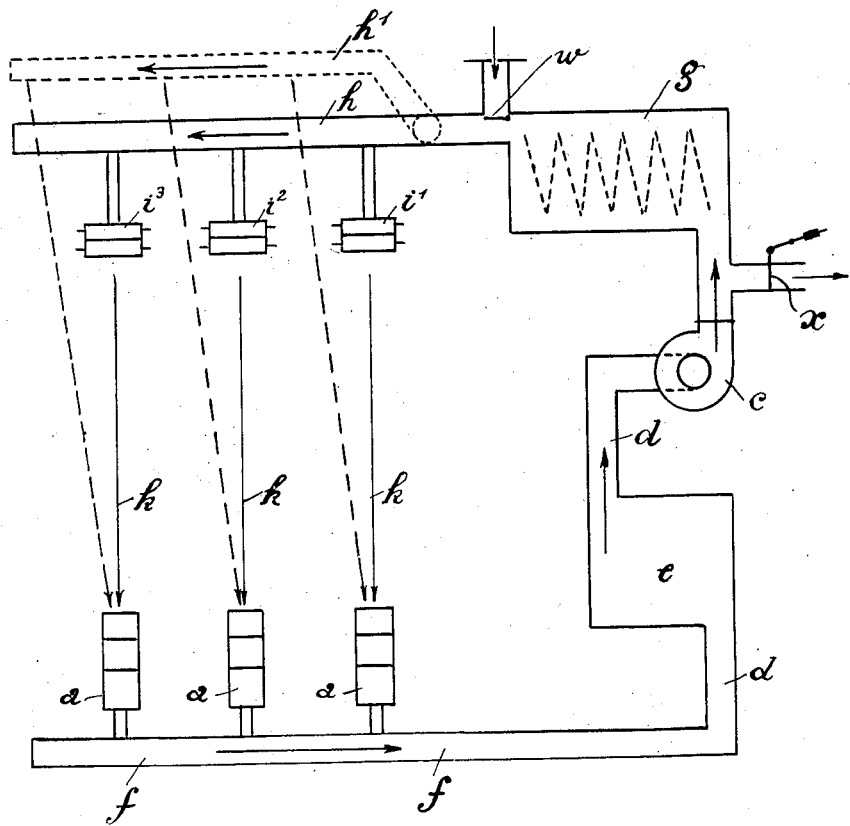
Fig. 2 is a diagrammatic view of the whole, in plan.

This aspiration will, besides, advantageously be utilized by itself in winter, and the air will be caused to circulate in open circuit (Fig. 2) between the aspiration valve $w$ and the exhaust valve $x$, open to the atmosphere.

Having thus described my invention I declare that what I claim and desire to secure by Letters Patent of the United States is:—

1. An apparatus for the manufacture of flours which comprises an elevator having a large carrying surface, passages between the lower part of said elevator and the grinding apparatus, passages from the upper part of the elevator to the bolting apparatus and means to ensure the cooling of the products ascending in the elevator by a current of cold air ascending in the first part of the run and a cold air current descending in the second part.

2. An apparatus for the manufacture of flour comprising a bucket elevator having a carrying surface provided with ribs to form strata, grinding apparatus connected at the foot of the elevator, bolting apparatus connected at its upper part to the upper end of the elevator and means to produce a cooling current of air for the products ascending in the elevator by two opposite air currents each of them acting during one half of the run.

3. An apparatus for the manufacture of flours comprising an elevator provided with ribbed buckets for spreading the products, grinding apparatus, passages to connect said apparatus to the lower part of the elevator, bolting apparatus, passages to connect same with the upper part of the apparatus, a passage connected with the middle part of the ascending branch of the elevator, a filter, a ventilator and a refrigerating apparatus connected in series with said passage; and two other passages extending from the refrigerating apparatus and connected one with the regrinding apparatus and the other with the passages extending from the bolting apparatus to the upper part of the elevator; means to ensure the separating of the products from the air at the bottom of the elevator simultaneously with the expansion of the lower current of air, and means to insure the expansion of the upper current of air.

4. An apparatus for the manufacture of flours comprising an elevator, a passage connected to the middle part of the ascending branch of the elevator, a filter, an aspirator-ventilator and a refrigerating apparatus mounted in series and extending from said passage, a first passage extending from the refrigerating apparatus between same and the grinding apparatus, passages between the grinding apparatus and the foot of the elevator at that point to constitute an expansion chamber for the air and to ensure the division of the flours; a second passage extending from the refrigerating apparatus, connections between said passage and other passages having an increasing cross section which connect the upper part of the elevator with the bolting apparatus, a valve in said passages to prevent the admission of atmospheric air and means to regulate the temperature of the circulating air in order to keep within the critical temperature of the cereal in treatment.

5. Apparatus for the manufacture of flours comprising an elevator having expansion chambers at the top and bottom, a passage connected to the middle part of the elevator, a filter, an aspirator-ventilator and a refrigerating apparatus connected in series extending from said passage, a first passage between the refrigerating apparatus and the grinding apparatus, passages between the grinding apparatus and an expansion chamber at the foot of the elevator, a second passage extending from the refrigerating apparatus, connections between said passage and the expansion chambers at the top of the elevator with the bolting apparatus, a valve in the latter chambers to prevent the admission of atmospheric air; pyrometers and valves at appropriate points to allow the regulation of temperature of the circulating air so as to keep within the critical temperature of the grain being treated means for putting the refrigerating medium out of circuit for operating with atmospheric air in open circuit during the winter.

6. An apparatus for the manufacture of flours comprising an elevator having an expansion chamber at its bottom, a passage connected to the middle part of the ascending branch of the elevator, a filter, a ventilating aspirator and a refrigerating apparatus mounted in series and extending from said passage; a conduit extending from the refrigerating apparatus to the grinding apparatus, passages between the grinding apparatus and the expansion chamber, passages of increasing cross-section at the top of the elevator for connecting the elevator to bolting apparatus, a second conduit extending from the refrigerating apparatus, to said latter passages, a valve in said latter passages to prevent the admission of atmospheric air, pyrometers and valves at the hottest end at the coldest points to allow the regulation of the temperature of the circulating air in order not to exceed the critical temperature of the grain being treated, valves in front and at the back respectively of the refrigerating apparatus in order to allow the working in open circuit with atmospheric air in winter.

7. Apparatus for the manufacture of flour which comprises an elevator, buckets for the elevator, the said buckets having an inclined carrying surface, provided with stria forming a surface arranged in rows, grinding means and conduits between this means and the bottom of the elevator, bolting means, and conduits between this means and the upper part of the elevator, and means for cooling the material coming up in the elevator by a current of cool air ascending in the first part of the run and a cold air current decending in the second part.

8. Apparatus for the manufacture of flour which comprises an elevator, a conduit communicating with the middle part of the ascending branch of the elevator, a filter, a ventilating aspirator and a refrigerating apparatus in series with this conduit a first conduit extending between the refrigerator and grinding apparatus, a conduit between the grinding apparatus and the bottom of the elevator, an enlargement on the elevator in this place to form an expansion chamber for the air and to assure the separation of the flour, a second conduit extending from the refrigerator, connections between the said conduit and other conduits of increasing cross-sections connecting the upper part of the elevator to the bolting apparatus, a valve in these conduits to prevent the entrants of the circulating air in a manner as not to exceed the critical temperature of the grain being treated and means on the general air conduit from one part to another of the refrigerator to eventually permit the cutting of this refrigerator out of circuit, the entrance of atmospheric air into the said refrigerator and the egress of the said air between the refrigerator and ventilator.

In testimony that I claim the foregoing as my invention, I have signed my name.

JEAN JOSEPH BERNARD LOIZILLON.